United States Patent [19]
Park

[11] Patent Number: 5,999,148
[45] Date of Patent: Dec. 7, 1999

[54] SELF-TEST DEVICE FOR MONITOR

[75] Inventor: Chan Seog Park, Kyoungsangbuk-Do, Rep. of Korea

[73] Assignee: LG Electronics Inc., Seoul, Rep. of Korea

[21] Appl. No.: 08/901,913

[22] Filed: Jul. 29, 1997

[30] Foreign Application Priority Data

Jul. 30, 1996 [KR] Rep. of Korea ...................... 96-31427

[51] Int. Cl.⁶ .................................................. G09G 1/06
[52] U.S. Cl. .............................................. 345/10; 348/177
[58] Field of Search .................................. 345/1, 12, 13, 345/14, 117, 22; 348/178, 179, 177, 184, 185, 189, 190

[56] References Cited

U.S. PATENT DOCUMENTS 5,670,972  9/1997  Kim ........................................... 345/13

FOREIGN PATENT DOCUMENTS 63-335483  12/1988  Japan .
2309136A   1/1997   United Kingdom .

Primary Examiner—Regina Liang
Attorney, Agent, or Firm—Oppenheimer Wolff & Donnelly LLP

[57] ABSTRACT

A self-test device for a monitor which enables a user to check whether the monitor is in a normal operating state or not by displaying a self-test pattern on the screen of the monitor if the user disconnect a cable connector of the monitor from a personal computer (PC). The self-test device includes a clamp signal generating section for receiving a pulse signal having a predetermined period and for generating a first pulse signal and a second pulse signal which is a clamp signal, and a self-test signal generating section for generating R',G',B' video signals which are self-test signals for the monitor by processing the first pulse signal generated from the clamp signal generating section and for outputting the R',G',B' video signals to the video processing section which is controlled by the clamp signal generated from the clamp signal generating section. If the cable connector is disconnected from the PC, a color block pattern formed by a combination of the R',G',B' video signals is displayed on the screen of the monitor, so that the user can recognize the state of the monitor by viewing the displayed color block pattern.

9 Claims, 5 Drawing Sheets

FIG. 5

| VIDEO TERMINAL | WAVEFORM | OPERATING STATE |
|---|---|---|
| R | ⎤⎦⎤⎦ `<R'>` | ⎤⎦⎤⎦ |
| G | ⎤⎦⎤⎦ `<G'>` | TR-ON Vz  R17, C13 INTEGRATING Q13 ON-OFF |
| B | ⎤⎦ `<B'>` | TR-ON Vz  C14, R18 DIFFERENTIATION Q14 ON-OFF |
| DISPLAY PATTERN | YL WH MAG | |

SELF-TEST DEVICE FOR MONITOR

BACKGROUND OF THE INVENTION

1. Field of the Invention

The present invention relates generally to a monitor. In particular, the present invention relates to a self-test device for a monitor which can self-test whether the monitor is in a normal operating state or not in case that a color picture is not displayed or is abnormally displayed on the screen of the monitor connected to a personal computer.

2. Description of the Related Art

Generally, a monitor has a self-test function whereby a prescribed picture for self-test is displayed on the screen so that a user can check the normal or abnormal state of the monitor by viewing the displayed picture if the user disconnect a cable connector of the monitor from the personal computer (PC) in case that a color picture is not displayed or is abnormally displayed on the screen of the monitor connected to the PC.

The conventional self-test circuit of a monitor, as shown in FIGS. 1 and 2, includes a cable connector 2 for connecting the monitor to a signal output section 1 of the PC, a display power management (DPM) section 3, connected to a self-test terminal ST of the cable connector 2, for performing a display power management function, a DPM control section 4 for receiving a self-test signal provided through the cable connector 2 and controlling the DPM section 3 according to the self-test signal, a video amplifying section 5, connected to red (R), green (G), blue (B) terminals of the cable connector 2, for amplifying R,G,B video signals inputted through the R,G,B terminals of the cable connector 2, and a video output section 6 for outputting the R,G,B video signals amplified by the video amplifying section 5 to display the outputted R,G,B video signals on the screen of the monitor.

In FIG. 2, the reference numeral $B^+$ denotes a DC supply voltage, 5A denotes a video amplifier, R1 to R10 denote resistors, C1 to C3 denote capacitors, Q1 to Q5 denote transistors, L1 to L4 denote coils, D1 denotes a diode, and LD1 and LD2 denote light emitting diodes (LEDs).

The operation of the conventional self-test circuit as constructed above will be explained.

Referring to FIGS. 1 and 2, in a state that the signal output section 1 of the PC is connected to the cable connector 2 of the monitor, the self-test terminal ST of the cable connector 2 becomes in electric contact with the signal output section 1 of the PC which is connected to ground. Accordingly, the video signal outputted from the PC is transferred to the monitor and then displayed on the screen of the monitor.

At this time, if a suspend/standby signal of a 'high' level is outputted from the DPM control section 4 which is connected to the self-test terminal ST of the cable connector, the transistors Q2 and Q3 in the DPM section 3 are turned on, causing the red LED LD1 to be turned off, while the green LED LD2 is turned on. Meanwhile, if the suspend/standby signal of a 'low' level is outputted from the DPM control section 4 when no video signal is displayed on the monitor screen, the transistors Q2 and Q3 are turned off, causing both the red and green LEDs LD1 and LD2 to be turned on, resulting in that the two LEDs LD1 and LD2, as a whole, display an umber color which is the combination of the red and green colors.

For instance, since the suspend/standby signal outputted from the DPM control section 4 becomes 'low' and thus the LEDs LD1 and LD2 display the umber color during the display power management (DPM) operation of the monitor, a user can recognize that the monitor is now performing the DPM function by viewing the displayed color of the LEDs LD1 and LD2.

If the cable connector 2 of the monitor is disconnected from the signal output section 1 of the PC in the normal operating state of the monitor as described above, the self-test terminal ST of the cable connector 2 is floated, causing the transistor Q1 in the DPM section 3 to be turned on. At this time, no video signal is displayed on the screen of the monitor. Also, the DPM function is not performed, and only the green LED LD2 is turned on.

In the conventional monitor which does not employ a microprocessor IC or an on-screen display (OSD) function, however, the DPM function is performed utilizing the self-test signal ST though the cable connector 2 of the monitor is disconnected from the signal output section 1 of the PC. Accordingly, a self-test pattern cannot be displayed on the monitor screen, and thus the user cannot check the normal or abnormal operating state of the monitor.

SUMMARY OF THE INVENTION

It is an object of the present invention to solve the problems involved in the prior art, and to provide a self-test device for a monitor which enables a user to check whether the monitor is in a normal operating state or not by displaying a self-test pattern on the screen of the monitor if the user disconnect a cable connector of the monitor from a PC in case that a color picture is not displayed or is abnormally displayed on the screen of the monitor which is connected to the PC.

In order to achieve the above object, there is provided a self-test device for a monitor comprising:

a cable connector for connecting/disconnecting the monitor to/from a signal output section of a PC, the cable connector having a self-test terminal and R,G,B video terminals provided therein;

a display power management (DPM) section, connected to the self-test terminal of the cable connector, for performing a DPM function;

a DPM control section for controlling the DPM section;

a flyback transformer for generating a flyback pulse signal;

a clamp signal generating section for receiving the flyback pulse signal generated from the flyback transformer, and for generating first and second clamp signals;

a unidirectional signal applying section for applying the first clamp signal generated from the clamp signal generating section to the self-test terminal of the cable connector;

a self-test signal generating section for receiving the first clamp signal generated from the clamp signal generating section, and for generating R',G',B' video signals to be displayed on a screen of the monitor for a self-test of the monitor;

a video amplifying section for amplifying R,G,B video signals inputted through the cable connector or the R',G,',B' video signals generated from the self-test signal generating section, the video amplifying section being clamp-controlled by the second clamp signal generated from the clamp signal generating section; and a video output section for outputting and displaying on the screen of the monitor the video signals amplified by the video amplifying section.

BRIEF DESCRIPTION OF THE DRAWINGS

The above object, other features and advantages of the present invention will become more apparent by describing the preferred embodiment thereof with reference to the accompanying drawings, in which:

FIG. 5 is a table explaining waveforms of the video signals processed by the video amplifying section in the monitor according to the present invention.

DETAILED DESCRIPTION OF THE PREFERRED EMBODIMENT

Figure 1:
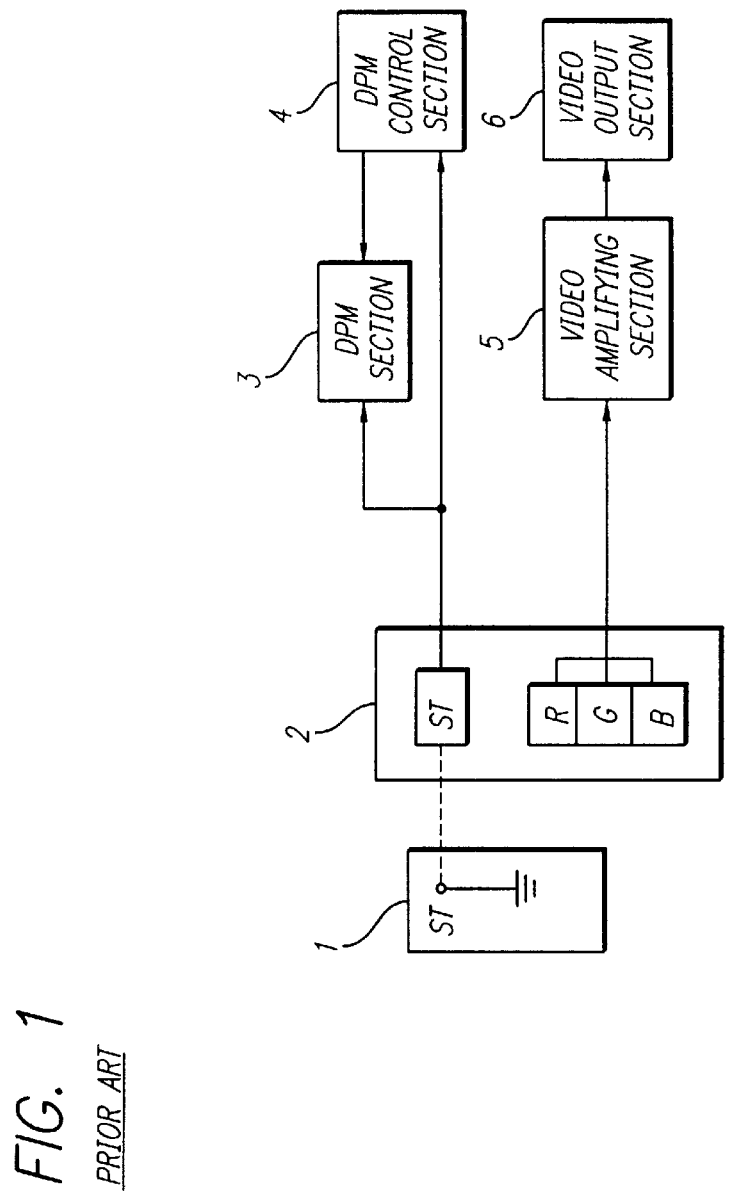
FIG. 1 is a block diagram of a conventional self-test device for a monitor.
Figure 2:
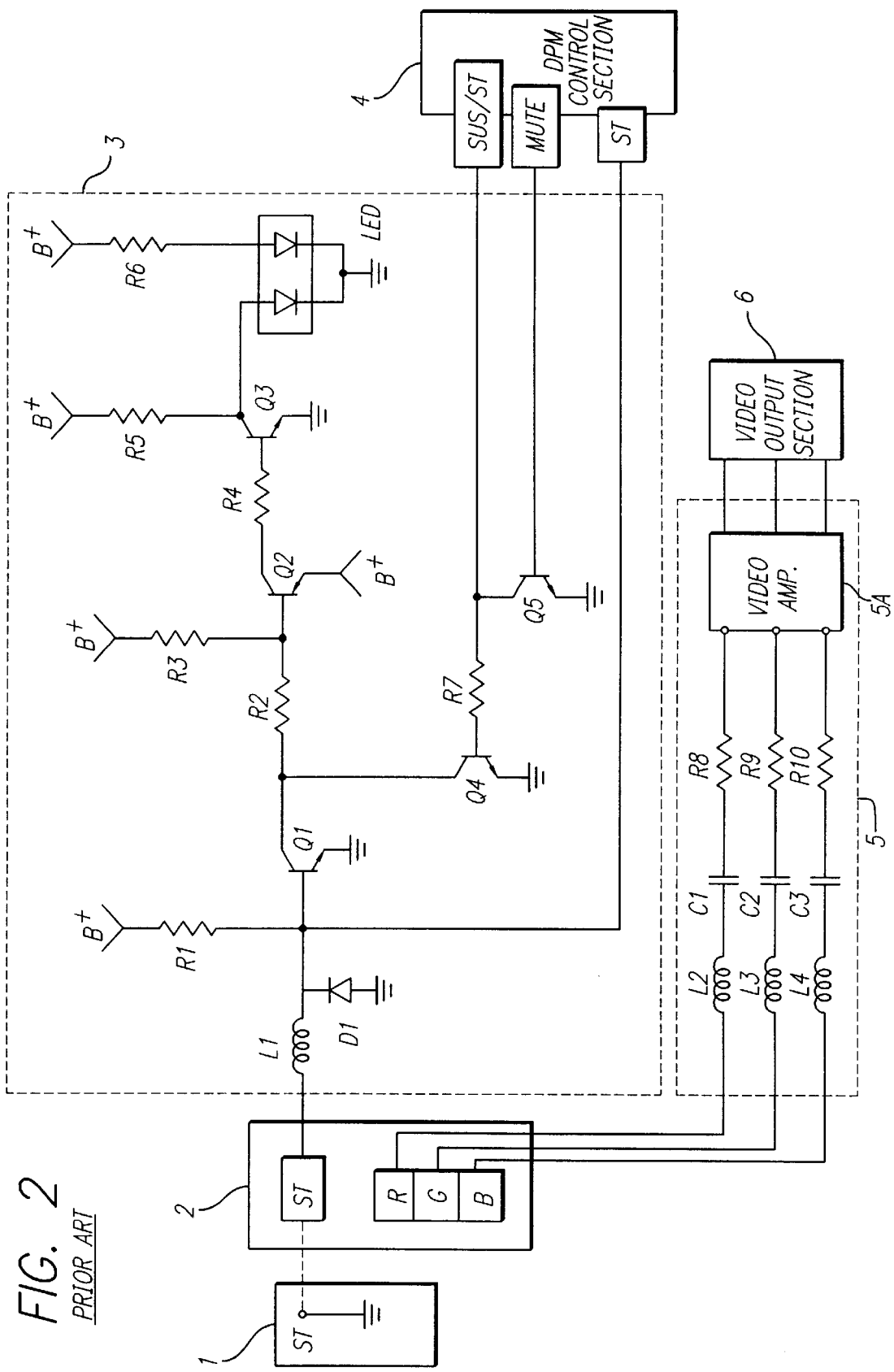
FIG. 2 is a schematic circuit diagram of the self-test device of FIG. 1.
Figure 3:
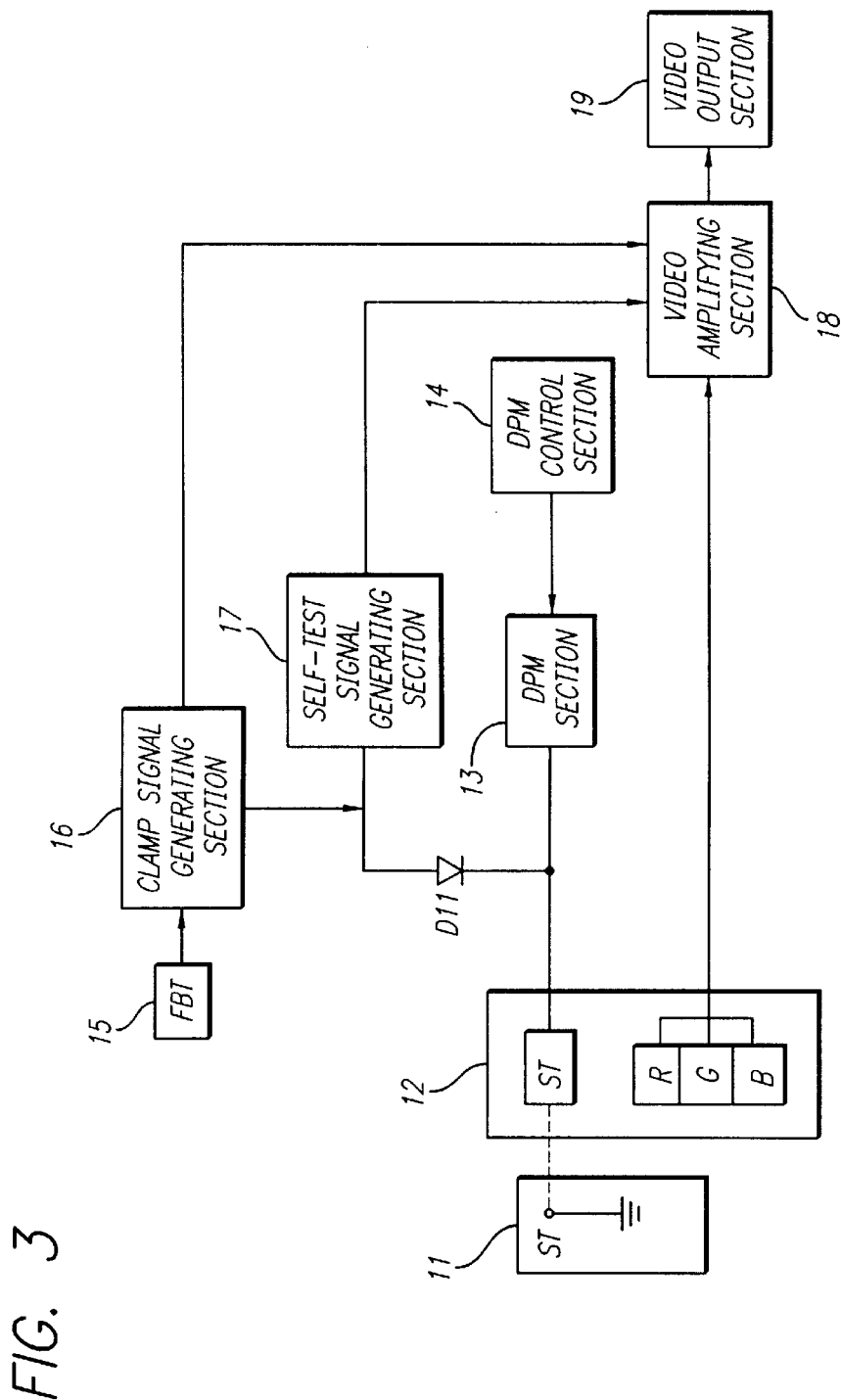
FIG. 3 is a block diagram of the self-test device for a monitor according to the present invention.
Figure 4:
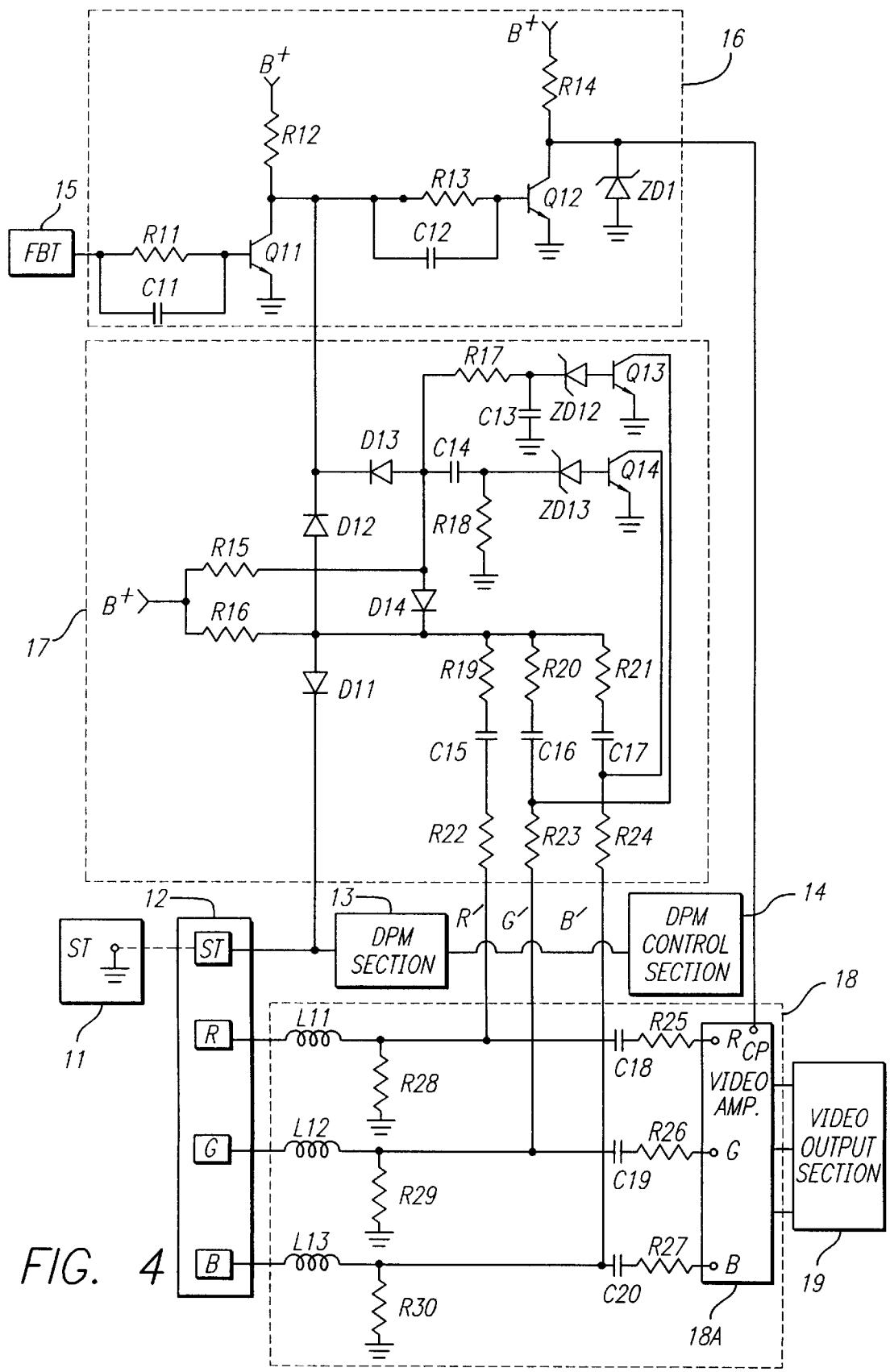
FIG. 4 is a schematic circuit diagram of the self-test device of FIG. 3 according to the preferred embodiment of the present invention.

FIG. 3 is a block diagram of the self-test device for a monitor according to the present invention, and FIG. 4 is a schematic circuit diagram of the self-test device of FIG. 3.

Referring to FIGS. 3 and 4, the self-test device for a monitor according to the present invention includes a cable connector 12 for connecting the monitor to a signal output section 11 of a PC, a DPM section 13, connected to a self-test terminal ST of the cable connector 12, for performing a DPM function, a DPM control section 14 for controlling the DPM section 13, a flyback transformer 15 for generating a flyback pulse signal, a clamp signal generation section 16 for receiving the flyback pulse signal and generating first and second clamp signals, a diode D11 for applying the first clamp signal generated from the clamp signal generation section 16 to the self-test terminal ST of the cable connector 12, a self-test signal generation section 17 for receiving the first clamp signal from the clamp signal generation section 16 and generating R',G',B' video signals, a video amplifying section 18 for being clamp-controlled by the second clamp signal generated from the clamp signal generation section 16 and for amplifying R,G,B video signals inputted through the cable connector 12 and the R',G',B' video signals generated from the self-test signal generation section 17, and a video output section 19 for outputting and displaying the video signals amplified by the video amplifying section 18 on the screen of the monitor.

The self-test signal generation section 17 includes diodes D12, D13, D14 for forming the R',G',B' signals as a color block pattern to be displayed on the monitor screen, an RC circuit, composed of a resistor R19 and a capacitor C15, for outputting the first clamp signal as the R' video signal, an integrating circuit, composed of a resistor R17 and a capacitor C13, for integrating the first clamp signal, a transistor Q13 for being switched on/off by the output of the integrating circuit and outputting the G' video signal, a differentiation circuit, composed of a capacitor C14 and a resistor R18, for differentiating the first clamp signal, and a transistor Q14 for being switched on/off by the output of the differentiating circuit and outputting the B' video signal.

In FIG. 4, the reference numerals 18A, R11 to R16 and R20 to R30, C11, C12 and C16 to C20, L11 to L13, Q11 and Q12, and ZD1 to ZD13 denote a video amplifier, resistors, capacitors, coils, transistors, and Zenor diodes, respectively.

The operation of the self-test circuit according to the present invention as constructed above will now be explained with reference to FIGS. 3 to 5.

The flyback pulse outputted from the flyback transformer 15 is inputted to a base of the transistor Q11 through the resistor R11 and capacitor C11 in the clamp signal generation section 16. Accordingly, the transistor Q11 is turned on and off repeatedly to output the first pulse signal which is the first clamp signal. The fist pulse is then inputted to a base of the transistor Q12 through the resistor R13 and capacitor C12, causing the transistor Q12 also to be turned on and off repeatedly to output the second clamp signal. The second clamp signal is applied to a clamp terminal CP of the video amplifier 18A in the video amplifying section 18 to control the operation of the video amplifier 18A.

Simultaneously, the first pulse outputted by the repetitive on/off operation of the transistor Q11 is inputted to the self-test signal generation section 17. The self-test signal generation section 17 then processes the first pulse signal to output the R',G',B' video signals which are self-test signals. The R',G',B' video signals are respectively inputted to the R,G,B input terminals of the video amplifier 18A in the video amplifying section 18.

In a state that the cable connector 12 of the monitor is connected to the signal output section 11 of the PC, the self-test terminal ST of the cable connector 12 comes in contact with the self-test terminal ST of the signal output section 11 of the PC which is connected to ground, and thus the diode D11 becomes forward-biased and is turned on. Accordingly, the first pulse outputted from the clamp signal generation section 16 is bypassed to ground through the diode D11. Thus, the self-test signal generation section 17 does not output the R',G',B' video signals, causing no video signal for self-test displayed on the monitor screen. In the normal operation state, the R,G,B video signals outputted from the PC are amplified by the video amplifier 18A in the video amplifying section 18, and then displayed on the monitor screen through the video output section 19. Also, the DPM function is performed depending on the existence or nonexistence of the input video signals from the PC.

If the cable connector 12 of the monitor is disconnected from the signal output section 11 of the PC to check whether the monitor is in the normal operating state, the R,G,B video signals from the PC are cut off, and the R',G',B' video signals, which are self-test signals, are displayed on the monitor screen, so that the user can check the operating state of the monitor. At this time, if the R',G',B' video signals are not displayed or are abnormally displayed on the monitor screen, the user can recognize the abnormal state of the monitor.

The display pattern of the R,G,B video signals is shown at the table of FIG. 5. The R' signal is a signal which retains the first pulse signal outputted from the clamp signal generation section 16. The G' signal is a signal produced by the on/off operation of the transistor Q13 which receives through its base the output of the integrating circuit for integrating the first pulse signal. The B' signal is produced by the on/off operation of the transistor Q14 which receives through its base the output of the differentiating circuit for differentiating the first pulse signal. The R',G',B' video signals outputted as described above are inputted to the video amplifying section 18 and then displayed on the monitor screen through the video output section 19. In other words, as illustrated in FIG. 5, the color block pattern composed of green, white and magenta blocks is formed by combination of the inputted R',G',B' video signals and is displayed on the monitor screen, so that the user can recognize the operating state of the monitor.

As described above, according to the present invention, if the user separates the cable connector of the monitor from the PC when a color picture is not displayed or abnormally displayed on the screen of the monitor which is connected to the PC, the color block pattern is displayed by the self-test function according to the present invention, and thus the user can recognize the operating state of the monitor by viewing the color block pattern, thereby providing convenience in use and improving the reliability of the product. Especially, the self-test device is applicable to the monitor which does not employ a microprocessor IC or an OSD function.

While the present invention has been described and illustrated herein with reference to the preferred embodiment thereof, it will be understood by those skilled in the art that various changes in form and details may be made therein without departing from the spirit and scope of the invention.

What is claimed is:

1. A self-test device for a monitor comprising:
    a cable connector for connecting/disconnecting the monitor to/from a signal output section of a personal computer (PC), the cable connector having a self-test terminal and R,G,B video terminals provided therein;
    a display power management (DPM) section, connected to the self-test terminal of the cable connector, for performing a DPM function;
    a DPM control section for controlling the DPM section;
    a flyback transformer for generating a flyback pulse signal;
    a clamp signal generating section for receiving the flyback pulse signal generated from the flyback transformer, and for generating first and second clamp signals;
    a unidirectional signal applying section for applying the first clamp signal generated from the clamp signal generating section to the self-test terminal of the cable connector;
    a self-test signal generating section for receiving the first clamp signal generated from the clamp signal generating section, and for generating R',G',B' video signals to be displayed on a screen of the monitor for a self-test of the monitor;
    a video amplifying section for amplifying R,G,B video signals inputted through the cable connector or the R',G,',B' video signals generated from the self-test signal generating section, the video amplifying section being clamp-controlled by the second clamp signal generated from the clamp signal generating section; and
    a video output section for outputting and displaying on the screen of the monitor the video signals amplifying by the video amplifying section.

2. A self-test device for a monitor as claimed in claim 1, wherein the first and second clamp signals generated from the clamp signal generating section are pulse signals.

3. A self-test device for a monitor as claimed in claim 1, wherein the unidirectional signal applying section comprises a diode, and wherein the diode prevents the R',G',B' video signals from being generated from the self-test signal generating section by bypassing the first clamp signal inputted to the self-test signal generating section to ground through the respective self-test terminals of the cable connector and the signal output section of the PC in case that the cable connector is connected to the signal output section of the PC.

4. A self-test device for a monitor as claimed in claim 1, wherein the self-test signal generating section comprises:
    three diodes for forming the R',G',B' video signals as a color block pattern to be displayed on the screen of the monitor;
    an RC circuit for outputting the first clamp signal generated from the clamp signal generating section as the R' video signal;
    an integrating circuit for integrating the first clamp signal;
    a first transistor for being switched on/off by an output of the integrating circuit and for outputting the G' video signal;
    a differentiation circuit for differentiating the first clamp signal; and
    a second transistor for being switched on/off by an output of the differentiation circuit and for outputting the B' signal.

5. A self-test device for a monitor as claimed in claim 4, wherein the color block pattern is formed by a combination of the R',G',B' video signals, and is composed of patterned blocks of green, white, and magenta colors, respectively.

6. A self-test device for a monitor having a cable connector for connecting/disconnecting the monitor to/from a signal output section of a personal computer (PC), and a video processing section for amplifying R, G, B video signals inputted through the cable connector to display the amplified video signals on a screen of the monitor, the self-test device comprising:
    a clamp signal generating section for receiving a pulse signal having a predetermined period, and for generating a first pulse signal and a second pulse signal which is a clamp signal;
    a self-test signal generating section for generating R', G', B' video signals which are self-test signals for the monitor by processing the first pulse signal generated from the clamp signal generating section, and for outputting the R', G', B' video signals to the video processing section which is controlled by the clamp signal generated from the clamp signal generating section, and
    a unidirectional signal applying section for applying the first pulse signal generated from the clamp signal generating section to the self-test terminal of the cable connector.

7. A self-test device for a monitor as claimed in claim 6, wherein the unidirectional signal applying section comprises a diode, and wherein the diode prevents the R', G', B' video signals from being generated from the self-test signal generating section by bypassing the first clamp signal inputted to the self-test signal generating section to ground through the respective self-test terminals for the cable connector and the signal output section of the PC when the cable connector is connected to the signal output section of the PC.

8. A self-test device for a monitor as claimed in claim 6, wherein the self-test signal generating section comprises:
    three diodes for forming the R',G',B' video signals as a color block pattern to be displayed on the screen of the monitor;
    an RC circuit for outputting the first clamp signal generated from the clamp signal generating section as the R' video signal;
    an integrating circuit for integrating the first clamp signal;
    a first transistor for being switched on/off by an output of the integrating circuit and for outputting the G' video signal;
    a differentiation circuit for differentiating the first clamp signal; and
    a second transistor for being switched on/off by an output of the differentiation circuit and for outputting the B' signal.

9. A self-test device for a monitor as claimed in claim 8, wherein the color block pattern is formed by a combination of the R',G',B' video signals, and is composed of patterned blocks of green, white, and magenta colors, respectively.

* * * * *